(12) United States Patent
Waghmare et al.

(10) Patent No.: US 10,967,918 B2
(45) Date of Patent: Apr. 6, 2021

(54) KICK DOWN AREA ENABLER

(71) Applicants: Sunil Waghmare, Rochester Hills, MI (US); Abhijeet Thorat, Troy, MI (US); Meenakshi Solaimalai, Auburn Hills, MI (US)

(72) Inventors: Sunil Waghmare, Rochester Hills, MI (US); Abhijeet Thorat, Troy, MI (US); Meenakshi Solaimalai, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 119 days.

(21) Appl. No.: 16/451,503

(22) Filed: Jun. 25, 2019

(65) Prior Publication Data

US 2020/0406983 A1   Dec. 31, 2020

(51) Int. Cl.
*B62D 25/20* (2006.01)

(52) U.S. Cl.
CPC ..... *B62D 25/2045* (2013.01); *B62D 25/2018* (2013.01)

(58) Field of Classification Search
CPC ............ B62D 25/2045; B62D 25/2018; B62D 21/152
USPC .................... 296/203.02, 187.01, 187.09, 75
See application file for complete search history.

(56) References Cited

U.S. PATENT DOCUMENTS

| | | | | |
|---|---|---|---|---|
| 5,125,715 A * | 6/1992 | Kijima | ................. | B62D 21/152 293/132 |
| 5,184,868 A * | 2/1993 | Nishiyama | ........... | B62D 21/152 296/187.09 |
| 5,882,065 A * | 3/1999 | Koiwa | ................. | B62D 25/082 296/187.09 |
| 6,145,923 A * | 11/2000 | Masuda | ............... | B62D 25/082 296/1.03 |
| 6,361,102 B1 * | 3/2002 | Han | .................... | B62D 25/2045 296/203.02 |
| 6,929,314 B2 * | 8/2005 | Hanyu | ................. | B62D 21/152 296/203.02 |
| 7,226,121 B2 | 6/2007 | Dandekar et al. | | |
| 7,243,981 B2 * | 7/2007 | Park | ..................... | B62D 21/152 280/784 |
| 8,967,701 B2 * | 3/2015 | Barbat | ................. | B62D 21/152 296/187.1 |
| 2002/0096904 A1 * | 7/2002 | Matsushita | ............... | B60N 3/06 296/75 |
| 2004/0113463 A1 * | 6/2004 | Song | .................. | B62D 25/2018 296/204 |
| 2020/0361533 A1 * | 11/2020 | Waghmare | ........... | B62D 21/152 |

* cited by examiner

*Primary Examiner* — Pinel E Romain
(74) *Attorney, Agent, or Firm* — Ralph E. Smith

(57) ABSTRACT

A vehicle rail assembly has an extending longitudinal rail with a kick down area. A kick down area enabler is positioned in the rail at the kick down area. The kick down area enabler includes a foot rest portion, an outer part portion and a kick down portion all contacting the rail. The outer part portion and kick down portion part are cantilevered from the foot rest portion via welding. The kick down area enabler provides additional energy absorption for the rail to prevent intrusion into a passenger compartment.

14 Claims, 4 Drawing Sheets

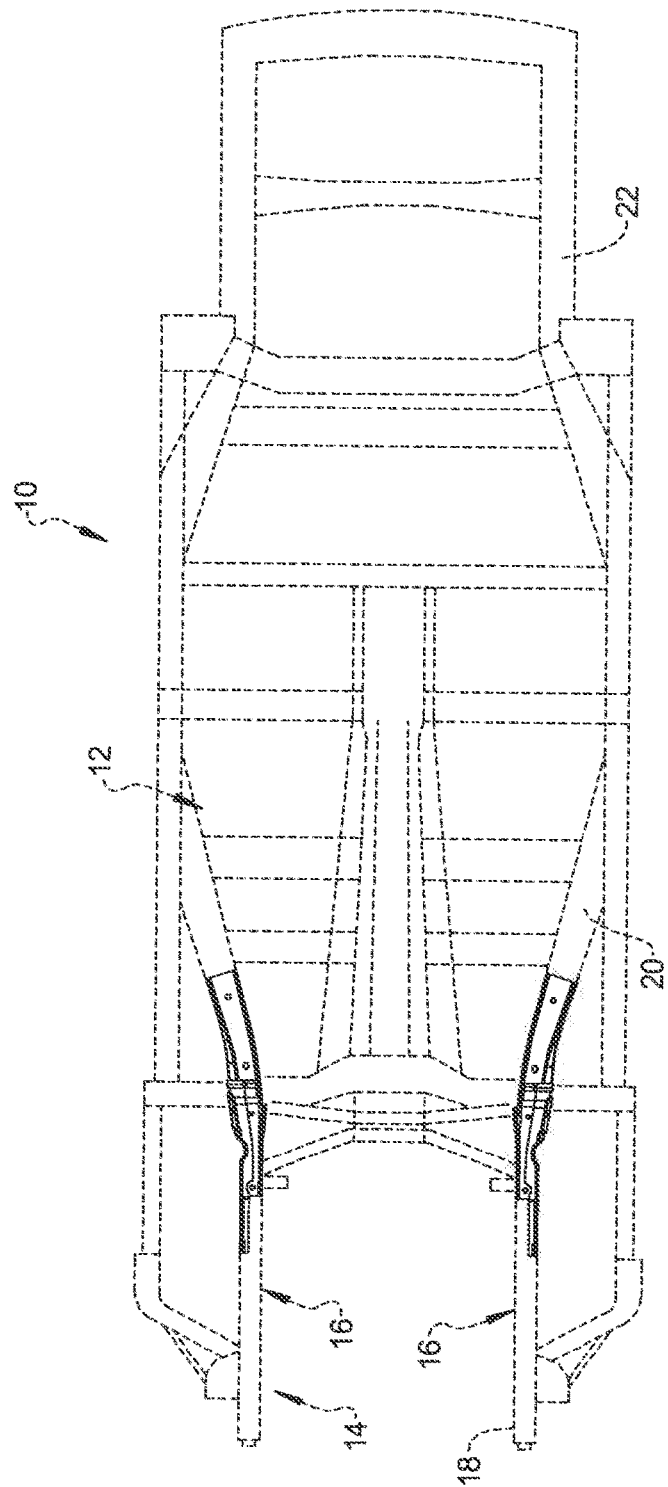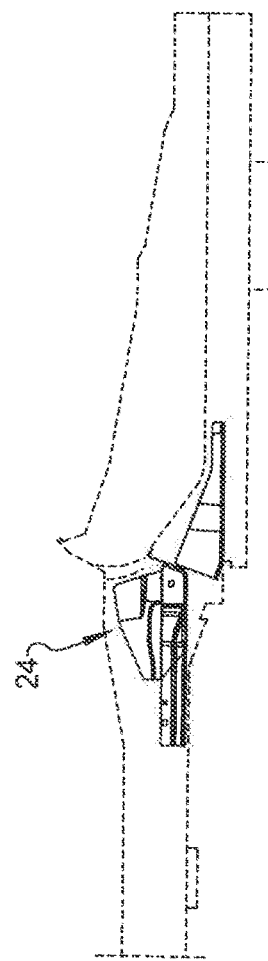

KICK DOWN AREA ENABLER

FIELD

The present disclosure generally relates to vehicles and, more particularly, to a rail assembly that supports the vehicle body.

BACKGROUND

Frames for vehicles are generally constructed by longitudinal rails. These longitudinal rails include a kick down area generally with an open C section. The kick down area is at the junction of the cabin foot rest and dash panel of the interior components. The longitudinal rail provides energy absorption in order to reduce passenger compartment intrusion. Various types of enablers exist in the art. However, these enablers are only concerned with deformation in the foot rest area. Thus, it is desirable to provide a kick down area enabler that provides for foot rest area deformation as well as deformation in the dash/firewall area to absorb more energy.

SUMMARY

The present disclosure provides a kick down area rail enabler that stabilizes the kick down area, and dash/firewall area to absorb energy and reducing passenger compartment intrusion. Also, the present disclosure provides a kick down rail enabler that helps to stabilize deformation in the foot rest area. The present disclosure provides a kick down area rail enabler that provides a local bending point to enable deformation of the rail to reduce passenger compartment intrusion. The present disclosure provides a multi-piece kick down area rail enabler that is welded together to provide more energy absorption in the kick down area.

According to the disclosure, a vehicle rail assembly comprises a rail extending longitudinally with respect to the vehicle. The rail includes a kick down area. A kick down area enabler is positioned in the rail at the kick down area. The kick down area enabler includes a foot rest part, an outer part and a kick down part all contacting the rail. The outer part and kick down part are cantilevered from the foot rest part, via welding. The kick down area enabler provides additional energy absorption to the rail to prevent intrusion into the passenger compartment area. The foot rest part includes a pair of sidewalls spaced apart from one another by a web. The kick down part and the outer part are welded to one or the other of the foot rest sidewalls. The kick down part is spot welded to the sidewall of the foot rest part while the outer part is bead welded to the other sidewall of the foot rest part. The kick down part has a sidewall substantially perpendicularly extending from a base. The sidewall secures to the rail. The outer part has an elongated sidewall extending from a base. The elongated sidewall secures to an outer part of the rail. The kick down part and outer part are secured to one another by welding.

A vehicle comprising a passenger compartment secured to a frame. The frame includes a rail extending longitudinally with respect to the vehicle and having a kick down area. A kick down area enabler is positioned in the rail at the kick down area. The kick down area enabler includes a foot rest part, an outer part and a kick down part all contacting the rail. The outer part and kick down part are cantilevered from the foot rest part, via welding. The kick down area enabler provides additional energy absorption to the rail to prevent intrusion into the passenger compartment area. The foot rest part includes a pair of sidewalls spaced apart from one another by a web. The kick down part and the outer part are welded to one or the other of the foot rest sidewalls. The kick down part is spot welded to the sidewall of the foot rest part while the outer part is bead welded to the other sidewall of the foot rest part. The kick down part has a sidewall substantially perpendicularly extending from a base. The sidewall secures to the rail. The outer part has an elongated sidewall extending from a base. The elongated sidewall secures to an outer part of the rail. The kick down part and outer part are secured to one another by welding.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is a top plan view of a schematic view of a vehicle.

FIG. 2 is a partial side elevation view of FIG. 1.

DETAILED DESCRIPTION

Figure 3:
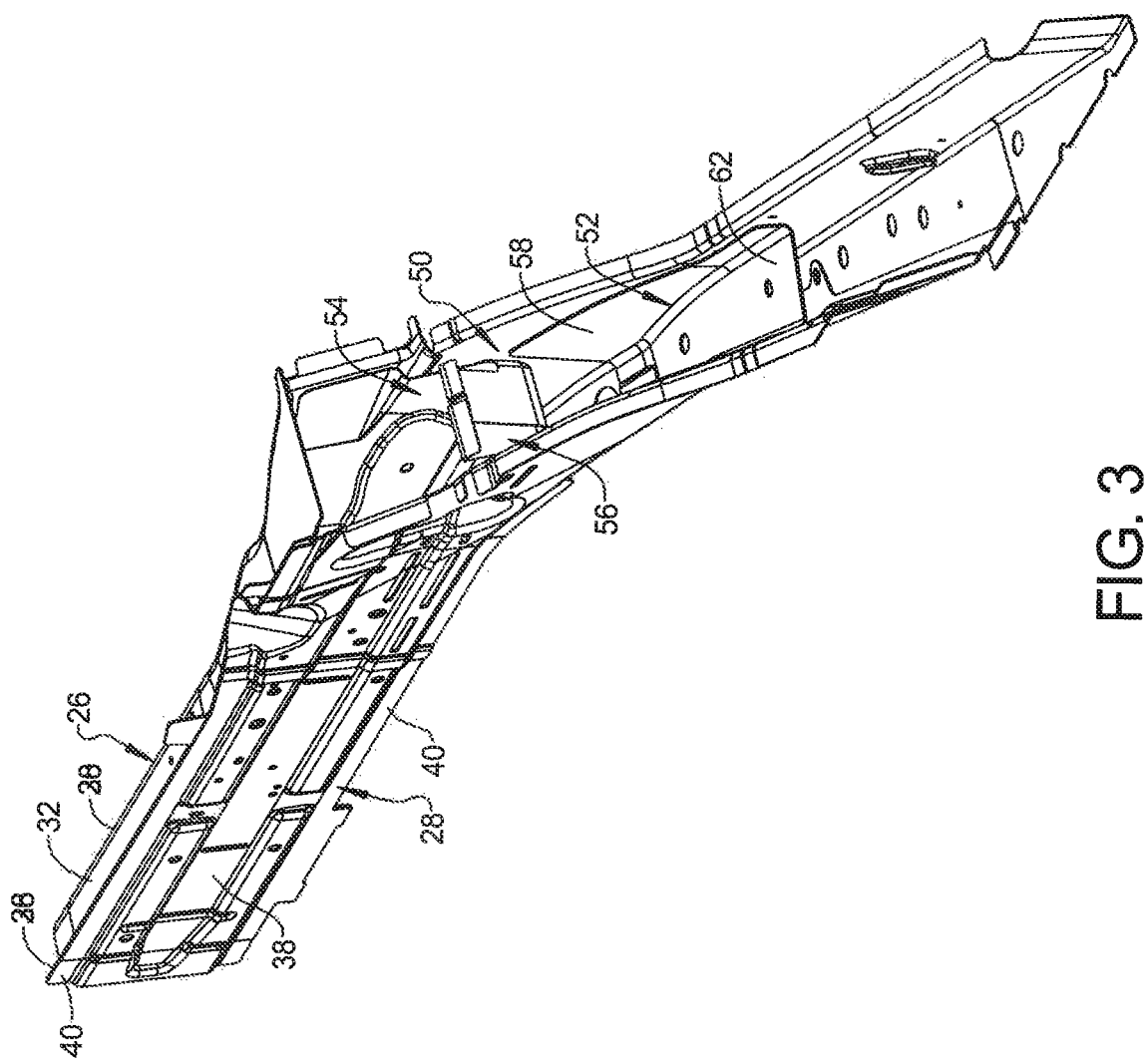
FIG. 3 is a perspective view of the rail kick down area with the enabler.
Figure 4:
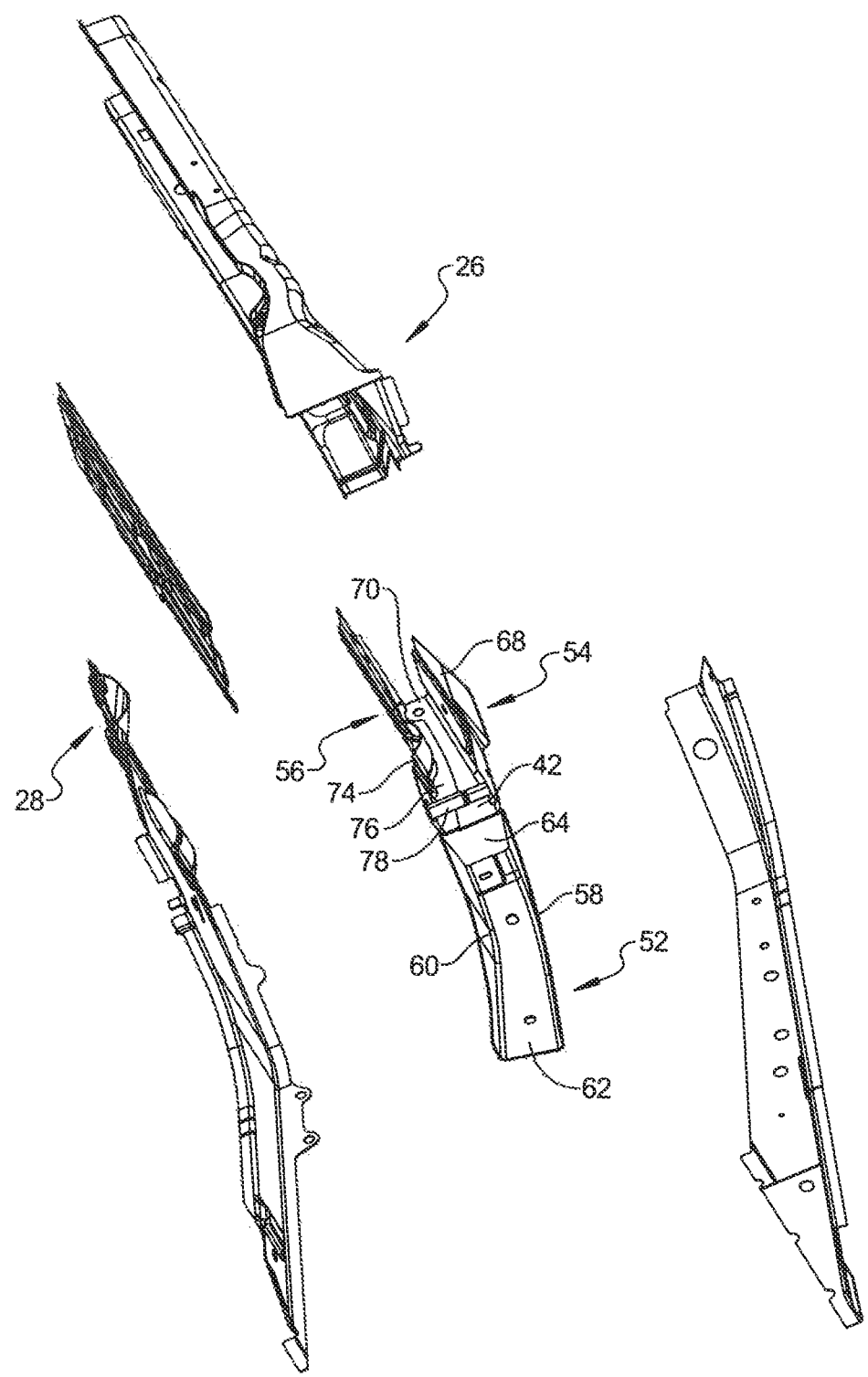
FIG. 4 is a top view of the enabler in the kick down area.
Figure 5:
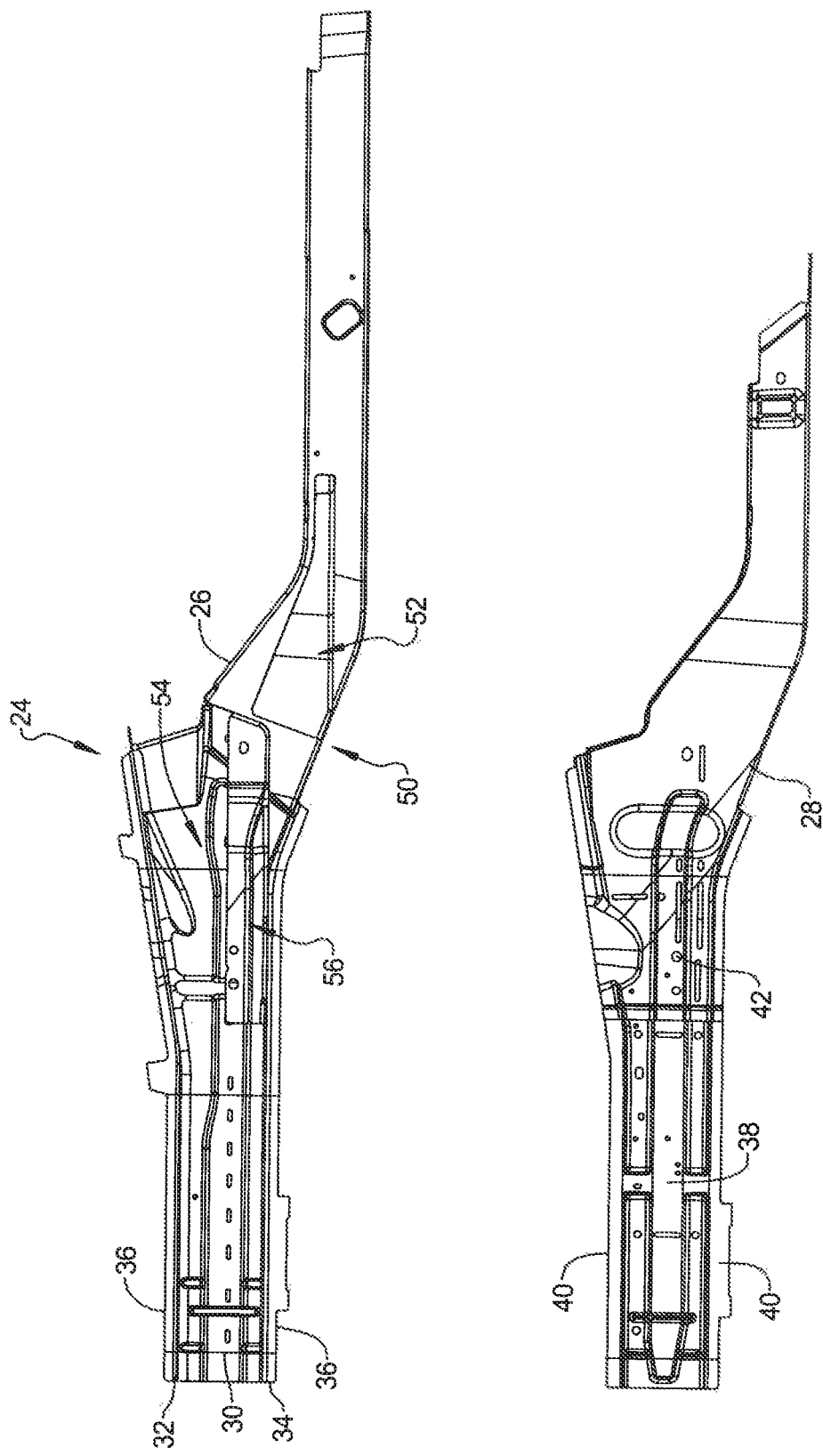
FIG. 5 is a side elevation view of the enabler in the rail with the outer rail removed.

Turning to the figures, a vehicle is illustrated and designated with the reference numeral 10. The vehicle 10 includes a passenger compartment 12 and a frame 14. The frame 14 includes a pair of rails 16. The rails are spaced laterally in a parallel relationship with respect to one another and extend longitudinally, forwardly, rearwardly, respectively. Each rail has a forward portion 18, a central portion 20 and a rear portion 22. In the illustrated embodiment, the forward portion 18 includes a kick down portion 24. The kick down portion 24 transitions from a higher vertical height to a lower vertical height via the rail.

The rail assembly 14 includes an inner member 26 and an outer member 28. The inner member 26 generally has an overall C shape with a web 30 separating legs or sides 32, 34. The sides 32, 34 include a flange 36. The outer rail has an overall planar body 38. The planar body 38 includes outer flanges 40 that abut with flanges 36 to enable the inner 26 and outer 28 members to be connected via spot welding or the like with one another. Additionally, the outer member 28 may have various stampings 42, for reinforcement purposes, on the body 38.

The kick back enabler 50 is positioned within the rail inner 26 and outer 28 parts at the kick down portion 24. The kick back enabler 50 includes a foot rest portion 52, a kick back portion 54 and an outer part portion 56. Foot rest portion 52 is U shaped with a pair of sidewalls 58 and 60 spaced apart by a web 62. The sidewalls 58 and 60 in side elevation having an overall triangular shape. The web has an open end 62 and a wall 64 closing off the end of the foot rest portion 52. The foot rest portion 52 is spot welded or the like to the rail 16. The foot rest portion 58 acts as an anchor in the foot rest area of the rail 16. It provides for enhanced deformation of the frame 14 or rail 16 in the foot rest area.

The kick down portion 54 includes a sidewall 68 and a base 70. The sidewall 68 extends substantially perpendicular to the base 70. The sidewall 68 may have any desired configuration to mesh with the stamped portion of the inner member 26 of the rail 16. Additionally, a wall 72 is formed at one end of the kick down part 54. The wall 72 is formed adjacent to the wall 64 of the foot rest portion 52. The wall 72 is spot welded with the wall 64 or side wall 68 of the foot rest portion 52.

The outer part portion 56 includes a sidewall 74 and a base 76. The sidewall 74 is elongated and extends longitudinally forward beyond the kick down portion 54. Additionally, the sidewall 74 tapers from a larger vertical portion into the smaller vertical portion inside the rail 16. The base 76 is substantially perpendicular to the sidewalls 74. Also, an end wall 78 is positioned adjacent the kick down end wall 72 and adjacent the foot rest end wall 64. The end wall 78 includes a bead weld connecting the outer wall portion 56 with the foot rest portion 52.

The outer part portion 56 and the kick down portion 54 are spot welded with one another to form the integral kick down enabler 50. The outer wall portion side wall 74 as well as the kick down sidewall 68 are spot welded to the respective inner 26 and outer 28 members. Additionally, the bases 70, 76 may be spot welded to the rail 16. The end or wall 72, 78 of the kick down part and outer part are adjacent to the dash panel of the passenger compartment 12. Accordingly, these parts provide additional energy absorption for the rail 16 to prohibit dash panel intrusion.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle rail assembly comprising:
  a rail extending longitudinally with respect to the vehicle having a kick down area; and
  a kick down area enabler positioned in the rail at the kick down area, the kick down area enabler including a foot rest portion contacting the rail, an outer part portion contacting the rail and a kick down portion contacting the rail, the outer part and kick down portion cantilever from the foot rest portion via welding, the kick down area enabler providing additional energy absorption for the rail to prevent intrusion into a passenger compartment area.

2. The vehicle rail assembly according to claim 1, wherein the foot rest portion includes a pair of sidewalls spaced apart from one another by a web.

3. The vehicle rail assembly according to claim 2, wherein the kick down portion and outer part portion are welded to one another.

4. The vehicle rail assembly according to claim 3, wherein the kick down portion is spot welded to the foot rest portion and the outer part is bead welded to the foot rest portion.

5. The vehicle rail assembly according to claim 1, wherein the kick down portion has a sidewall substantially perpendicular extending from a base, the sidewall secured to the rail.

6. The vehicle rail assembly according to claim 1, wherein the outer part portion has an elongated sidewall extending from a base, the longitudinal sidewall is secured to an outer part of the rail.

7. The vehicle rail assembly according to claim 1, wherein the kick down portion and outer part portion are secured with one another.

8. A vehicle comprising:
  a frame;
  a passenger compartment secured to the frame;
  the frame including:
  a rail extending longitudinally with respect to the vehicle having a kick down area; and
  a kick down area enabler positioned in the rail at the kick down area, the kick down area enabler including a foot rest portion contacting the rail, an outer part portion contacting the rail and a kick down portion contacting the rail, the outer part and kick down portion cantilever from the foot rest portion via welding, the kick down area enabler providing additional energy absorption for the rail to prevent intrusion into a passenger compartment.

9. The vehicle according to claim 8, wherein the foot rest portion includes a pair of sidewalls spaced apart from one another by a web.

10. The vehicle according to claim 9, wherein the kick down portion and outer part portion are welded to one another.

11. The vehicle according to claim 10, wherein the kick down portion is spot welded to the foot rest portion and the outer part portion is bead welded to the foot rest portion.

12. The vehicle according to claim 8, wherein the kick down portion has a sidewall substantially perpendicular extending from a base, the sidewall is secured to the rail.

13. The vehicle according to claim 8, wherein the outer part portion has an elongated sidewall extending from a base, the longitudinal sidewall is secured to an outer part of the rail.

14. The vehicle according to claim 8, wherein the kick down portion and outer part portion are secured with one another.

* * * * *